(12) United States Patent
Aleong et al.

(10) Patent No.: US 8,380,639 B2
(45) Date of Patent: Feb. 19, 2013

(54) ONE-WAY PUBLIC RELATIONSHIPS

(75) Inventors: Michelle M. Aleong, Seattle, WA (US); Paul A. Elliott, Woodinville, WA (US); Bhupinder S. Sethi, Redmond, WA (US); Eric J. Zappa, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 680 days.

(21) Appl. No.: 12/498,279

(22) Filed: Jul. 6, 2009

(65) Prior Publication Data

US 2011/0004519 A1  Jan. 6, 2011

(51) Int. Cl.
*G06Q 10/00* (2012.01)
(52) U.S. Cl. .......................................... 705/319; 705/1.1
(58) Field of Classification Search ........................ 705/1
See application file for complete search history.

(56) References Cited

U.S. PATENT DOCUMENTS

| | | | |
|---|---|---|---|
| 2008/0086431 A1 | 4/2008 | Robinson et al. | |
| 2008/0104679 A1* | 5/2008 | Craig | 726/4 |
| 2008/0120397 A1 | 5/2008 | Hartman | |
| 2008/0133677 A1 | 6/2008 | Pattabhiraman et al. | |
| 2009/0183179 A1* | 7/2009 | Keith et al. | 719/318 |
| 2009/0313559 A1* | 12/2009 | Kane | 715/760 |
| 2010/0217645 A1* | 8/2010 | Jin et al. | 705/9 |
| 2010/0250618 A1* | 9/2010 | Ourega | 707/803 |
| 2011/0004692 A1* | 1/2011 | Occhino et al. | 709/228 |

FOREIGN PATENT DOCUMENTS

WO 2008109705 A2 9/2008

OTHER PUBLICATIONS

Grace, Hazel, "So, you have Facebook Fans: Now What?", Retrieved at <<http://adammetz.com/metzmash/so-you-have-facebook-fans-now-what>>, Feb. 19, 2009, pp. 1-7.
"ORKUT", "Icons": About fans, Retrieved at <<http://help.orkut.com/bin/answer.py?hl=en&answer=11766>>, Mar. 18, 2009, p. 1.
"Sluiceboxrocks.com", Retrieved at <<http://sluiceboxrocks.com/id4.html>>, Mar. 18, 2009, p. 1.
"Become a Fan! Join us on Facebook", Retrieved at <<http://www.buymmoaccounts.com/blog/2009/02/become-a-fan-join-us-on-facebook/>>, Feb. 26, 2009, pp. 1-3.
McCarthy, Caroline, "Friendster, in a Bid for Popularity, Introduces Fan Profiles", Retrieved at <<http://news.cnet.com/8301-13577_3-9786080-36.html>>, Sep. 27, 2007, pp. 1-3.

* cited by examiner

*Primary Examiner* — Jonathan Ouellette
(74) *Attorney, Agent, or Firm* — Wolfe-SBMC

(57) ABSTRACT

Techniques are described to establish one-way public relationships. In an implementation, a control is exposed that is operable to become a fan of an object within a social networking page. Responsive to operation of the control, data may be stored to establish a one-way public relationship between a user and the selected object. By establishing a one-way public relationship rather than a mutual friend relationship, the object and/or a corresponding owner of the object is not included in the user's social network and is not provided access to the user's profile, status, or other personal information. The one-way public relationship may be employed by a service provider to serve content related to the object to the user. The one-way public relationships may also be employed by the service provider to push status updates regarding the object to "fans" of the object.

20 Claims, 7 Drawing Sheets

ONE-WAY PUBLIC RELATIONSHIPS

BACKGROUND

The popularity of social networking via online networking sites is ever increasing. One way that people use social networking sites is to share information such as recommendations, pictures, videos, notes, discussions, and so forth on profile pages.

Sometimes, a user may come across an object (person, group, or thing) on a social networking page that they like and would like to express interest in. Using a traditional approach, the user may establish a mutual friend relationship with the object to add the object to the user's social network and then provide input to become a fan of the object. By establishing the mutual friend relationship with the object, the user enables reciprocal access to the user's social network information, such as posted pictures and profile information. This may be alright with the user if the owner of the object is a close friend of the user's. However, in some instances the user may just want to be a fan of a public object (e.g., a rock band, author, book, business) without becoming friends with the object or a corresponding owner. As such, privacy concerns with the traditional approach may inhibit users from becoming fans of public objects.

SUMMARY

Techniques are described to establish one-way public relationships for social networking. In an implementation, a control is exposed that is operable to become a fan of an object within a social networking page. Responsive to operation of the control by a user, data may be stored to establish a one-way public relationship between the user and the selected object. By establishing a one-way public relationship rather than a mutual friend relationship, the object and/or a corresponding owner of the object is not included in the user's social network and is not provided access to the user's profile, status, or other personal information. The one-way public relationship may be employed by a service provider to serve content and/or ads related to the object to the user. The one-way public relationships may also be employed by the service provider to push status updates regarding the object to "fans" of the object without establishing mutual friend relationships between the fans and the object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
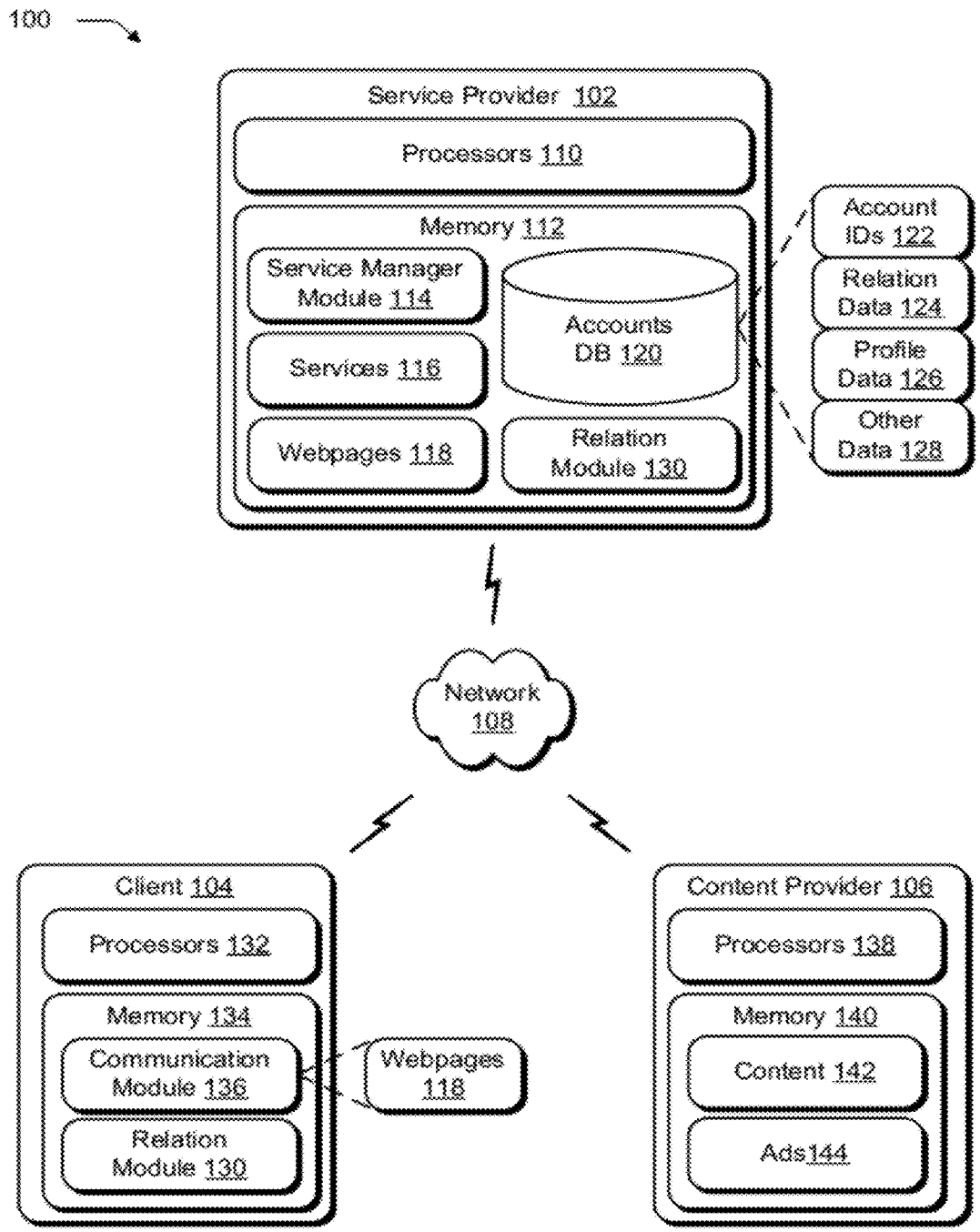
FIG. 1 is an illustration of an environment in an example implementation that is operable to provide one-way public relationships.

A user may come across an object (person, group, or thing) on a social networking page that they like and would like to express interest in. To do so using a traditional approach, the user may establish a mutual friend relationship with the object that adds the object to the user's social network. Since a mutual friend relationship with the object enables access to the user's private social network information, some users may be reluctant to establish mutual friend relationships with public entities such as bands, businesses, and social organizations.

Techniques are described to establish one-way public relationship in a social networking environment. In an implementation, a control is exposed within a social networking page that is operable to become a fan of an object. Responsive to operation of the control by a user, data may be stored to establish a one-way public relationship between the user and the selected object. By establishing a one-way public relationship instead of a mutual friend relationship, the object and/or a corresponding owner of the object are not included in the user's social network and are not provided access to the user's profile, status, or other personal information. The user is able, however, to obtain content and/or status updates related to the object based on the one-way public relationship.

For example, Steve may have a social networking account through a service provider that enables Steve to interact with a group of friends. This may include sharing favorite objects one to another, such as music groups, movies, and books. To select favorite objects, Steve may navigate to various webpages provided by the service provider and make selections of the objects. A user who has selected a favorite object may be referred to herein as a "fan" of the object.

For example, Steve may notice that some of his friends have become fans of the band "U2". Steve then navigates to a profile page for the band "U2" using the social networking account. The profile page for "U2" exposes a portion that is selectable by Steve to add "U2" to his favorite objects. For example, a control, such as an "Add" button, may be exposed that is selectable to enable Steve to become a fan of "U2" (e.g., add "U2" as a favorite object). Steve may decide that he wants to add the band "U2" as one of his favorite bands.

When Steve clicks on the "Add" button, a relation module operates to establish a social networking relationship between Steve and "U2". In at least some embodiments, the control is operable by a single-click to establish a one-way public relationship between Steve and "U2". For instance, a one-way public relationship may be established using accounts with the service provider corresponding to Steve and/or "U2". Based on this relationship, Steve may be able to post on "U2's" profile page, and obtain content and/or status updates related to "U2" based on the one-way public relationship. The one-way public relationship may also be employed by the service provider to serve content and/or ads related to "U2" to Steve's account across various services. The one-way public relationship may further be employed by the service provider to push status updates for "U2" to Steve's account. A mutual friend relationship is not established between Steve and "U2" in this instance. Accordingly, "U2" is not provided reciprocal access to Steve's social network and related information and is not added to Steve's contacts.

In the discussion that follows, a section entitled "Example Environment" describes an example environment and devices, which may be employed to provide one-way public relationships in various embodiments. Following this, a section entitled "One-Way Public Relationship Examples" describes example techniques and user interfaces related to one-way public relationships in accordance with one or more embodiments. Last, a section entitled "Example Devices" is provided and describes example devices that can be used to implement one or more embodiments.

Example Environment

FIG. 1 is an illustration of an example environment 100 that is operable to provide one-way public relationships. The illustrated environment includes one or more service providers 102, one or more clients 104, and one or more content providers 106 that are communicatively coupled, one to another, over a network 108. Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

For the purposes of the following discussion, a referenced component, such as service provider 102, may refer to one or more entities, and therefore by convention reference may be made to a single entity (e.g., the service provider 102) or multiple entities (e.g., the service providers 102, the plurality of service providers 102, and so on) using the same reference number.

The service provider 102 may have one or more processors 110 and memory 112. Service provider 102 is depicted as storing a service manager module 114 in the memory 112 that is executable via the one or more processors 110. Service manager module 114 represents functionality operable by service provider 102 to manage various services 116 that may be made available over the network 108. For example, various services 116 may be provided via webpages 118, or other user interfaces, that are communicated over the network for output by the one or more clients 104. Service manager module 114 may manage access to the services 116, performance of the services 116, configuration of the webpages 118 to provide the services 116, and so on.

Some examples of services 116 include, but are not limited to, a search service, an e-mail service to send and receive e-mail, instant messaging service to provide instant messages between clients 104, and a social network service to facilitate connections and interactions between groups of users who share common interests and activities. The social network service may assist users in connecting to a group, provide a variety ways for users to interact (e.g., group e-mail, website, blog, messaging) and provide recommendations to the groups based on shared interests and activities. In at least some embodiments, social network service may also be configured for selection of favorite objects in accordance with techniques described herein. At least some objects may be selected and associated with users using one-way public relationships. Service provider 102 may leverage the one-way public relationships to serve content, updates, ads and so forth related to an object to fans of object across the various services 116. Additional examples of services 116 include a shopping service, a weblog service, productivity service, authentication service, a news service, and an advertisement service to name a few.

The authentication service may be provided by the service manager module 114 to authenticate clients to access various services 116 that may be provided by one or more of the service providers 102. For example, a client 104 may provide a username and password that is authenticated by the authentication service. When the authentication is successful, the authentication service may pass a token to enable access to corresponding services 116. Authentication of the client 104 to an account may provide access to a single corresponding service provider 102 and/or service 116. Additionally or alternatively, a single authentication (e.g., a single sign-on) may correspond to many services 116, such that authentication to a single account provides access to many service providers 102 and/or to an entire suite of services 116.

Service manager module 114 may also manage an accounts database 120 that may be configured to store a variety of data related to user accounts with the one or more service providers 102. By way of example and not limitation, accounts database 120 is depicted as storing account identifiers 122 that may be used for authentication and access control (e.g., unique account IDs, usernames, passwords, and so on), relation data 124 that may define favorite objects, friends, and relationships associated with user accounts, and profile data 126 that may describe user settings, preferences, and personal pages accessible through a social networking service and/or other services 116. A variety of other data 128 is also contemplated, including service authorizations, user preferences, program files such as documents and spreadsheets maintained online, and other data typically associated with user accounts.

Service provider 102 is also depicted as storing a relation module 130 in memory 112 that is executable via the one or more processors 110 to implement aspects of techniques for one-way public relationships described herein. In an embodiment, functionality represented by the relation module 130 may be implemented as an application programming interface (API) that may be made accessible to the clients 104 over the network 108.

The one or more clients 104 are depicted as having one or more processors 132 and memory 134. Memory 134 is depicted as storing another relation module 130 that may be deployed to the client 104 and is executable via the one or more processors 132 to implement "client-side" aspects of one-way public relationships herein. In an embodiment, functionality represented by the relation module 130 may be implemented as a script that is included with a webpage 118 provided by the service provider 102.

To enable various communications over the network 108, the one or more clients 104 may also include a communication module 136. Communication module 136 is depicted as being stored in memory 134 and is also executable via the processor 132 to provide various interactions with service providers 102 and/or services 116. Examples of such interactions include, but are not limited to, communicating one to another, navigating content, searching webpages, accessing services 116, interacting with a social networking site, performing searches, instant messaging, e-mail, and so forth. Communication module 136 may be implemented as a browser or other suitable application to obtain and output webpages 118 from the service provider 102 over the network 108. Communication module 136 may also represent a component of another application used to obtain one or more services 116 from the service providers 102. For example, communication module 136 may be configured as a component of a desktop social networking application of a client 104.

As noted above, content, updates, and/or ads may be served to clients 104 based at least in part upon one-way public relationships established between the client's and objects. Content may be from the service provider 102 and/or from third party sources, such as the one or more content providers 106 depicted in the environment 100. The one or more content providers 106 are depicted as having one or more processors 138 and memory 140. Memory 140 may store a variety of content 142 that may be selectively provided to the client 104 based upon relationships to favorite objects. Examples of content 142 include but are not limited to album audio/video clips, webpages, artwork, band images, book images, artist/author pictures, descriptions, content metadata (e.g., dates, filenames, chapters, titles, author, notes, publisher, source), fans data and demographics, and so forth. Memory 104 is further illustrated as storing advertisements 144, which may also be selectively provided to the client 104 based upon relationships to favorite objects. Various advertisements are contemplated including banner ads, audio/video ads, pop-up ads, and so forth. The content 142 and advertisements 144 may be provided in conjunction with a plurality of services 102 provided to a user by the service provider 102.

Having considered devices and components of an example environment, consider now example techniques and user interfaces for one-way public relationships that may be implemented in the environment using the example components, as well as in other environments.

One-Way Public Relationship Examples

The following discussion describes example techniques and user interfaces for one-way public relationships that may be implemented utilizing the previously described systems and devices. Aspects of the procedures described below may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example environment 100 of FIG. 1.

Figure 2:
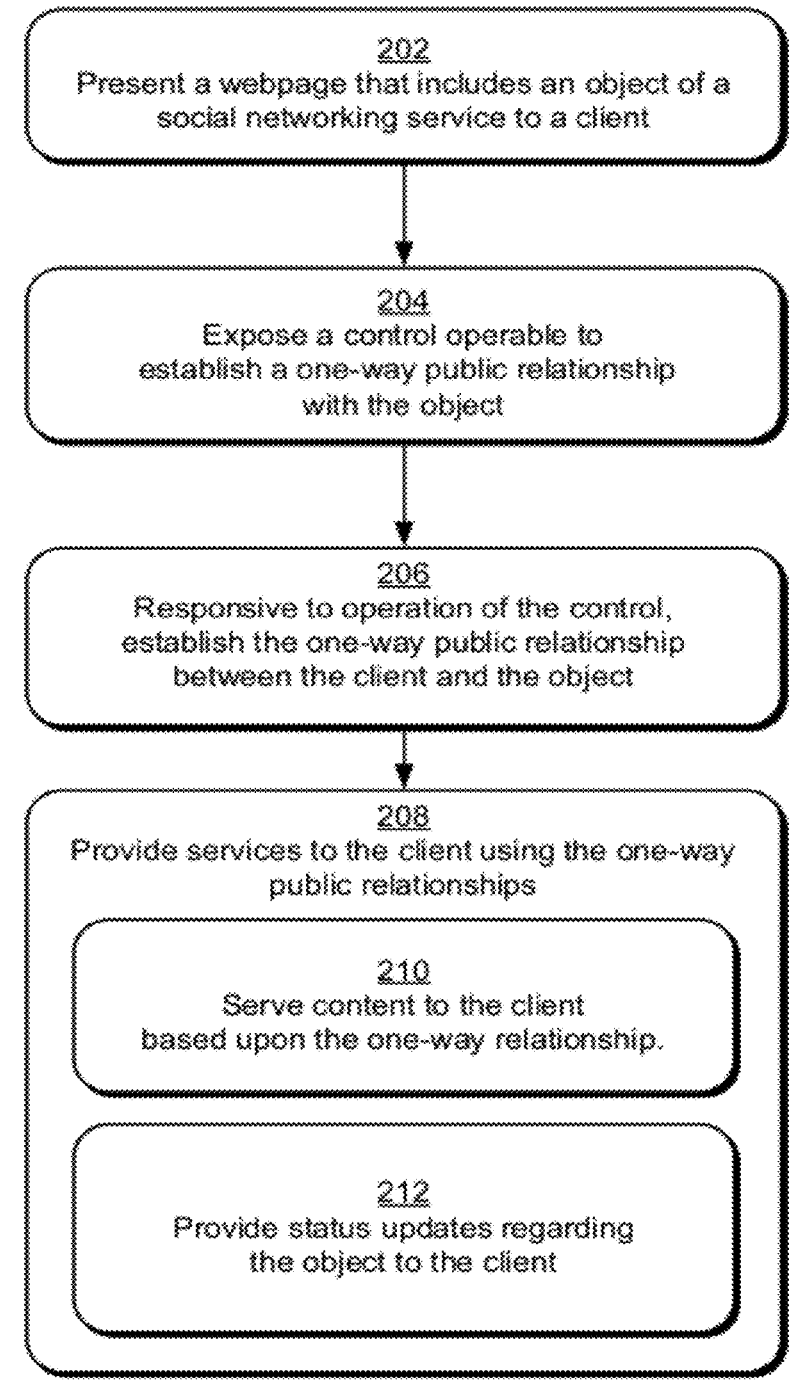
FIG. 2 is a flow diagram depicting a procedure in an example implementation in which a one-way public relationship is established.

FIG. 2 depicts a procedure 200 in an example implementation in which a service provider enables creation of one-way public relationships with objects in a social network. In at least some embodiments, procedure 200 may be performed by a suitably configured service provider, such as service provider 102 of FIG. 1 having a relation module 130. In the discussion of FIG. 2 that follows, reference may be made to the example webpage depicted in FIG. 3.

A webpage is presented to a client that includes an object of a social networking service (block 202). For example, a user such as Steve in the example above may interact with a communication module 136 of a client 104 to obtain webpages 118 from a service provider 102. Steve may utilize an account with the service provider 102 to access webpages 118 corresponding to various services 116. In at least some embodiments, the webpages 118 may be exposed in the course of Steve's interaction with a social networking service available from the service provider 102. Service provider 102 may execute a service manager module 114 and/or a relation module 130 to provide the interaction with the social networking service, as well as other services 116.

The social networking service may enable interaction with various objects. The objects may be associated with other users, groups, profile pages, user accounts, things (images, art, songs, books, posts, products) and so forth. Generally, an object has an owner (e.g., a book has an author, albums have a band, and so on) and may be associated with an account of the owner with the service provider 102. The objects may be accessible though social networking pages of the corresponding owners and/or through various other webpages 118 output by the service provider 102 in the course of providing services 116 to clients 104. For example, Steve may navigate to a profile page corresponding to the band "Foo Fighters" that has various objects including objects for the band, albums of the band, songs of the band, album art work, and postings of the band, to name a few.

Figure 3:
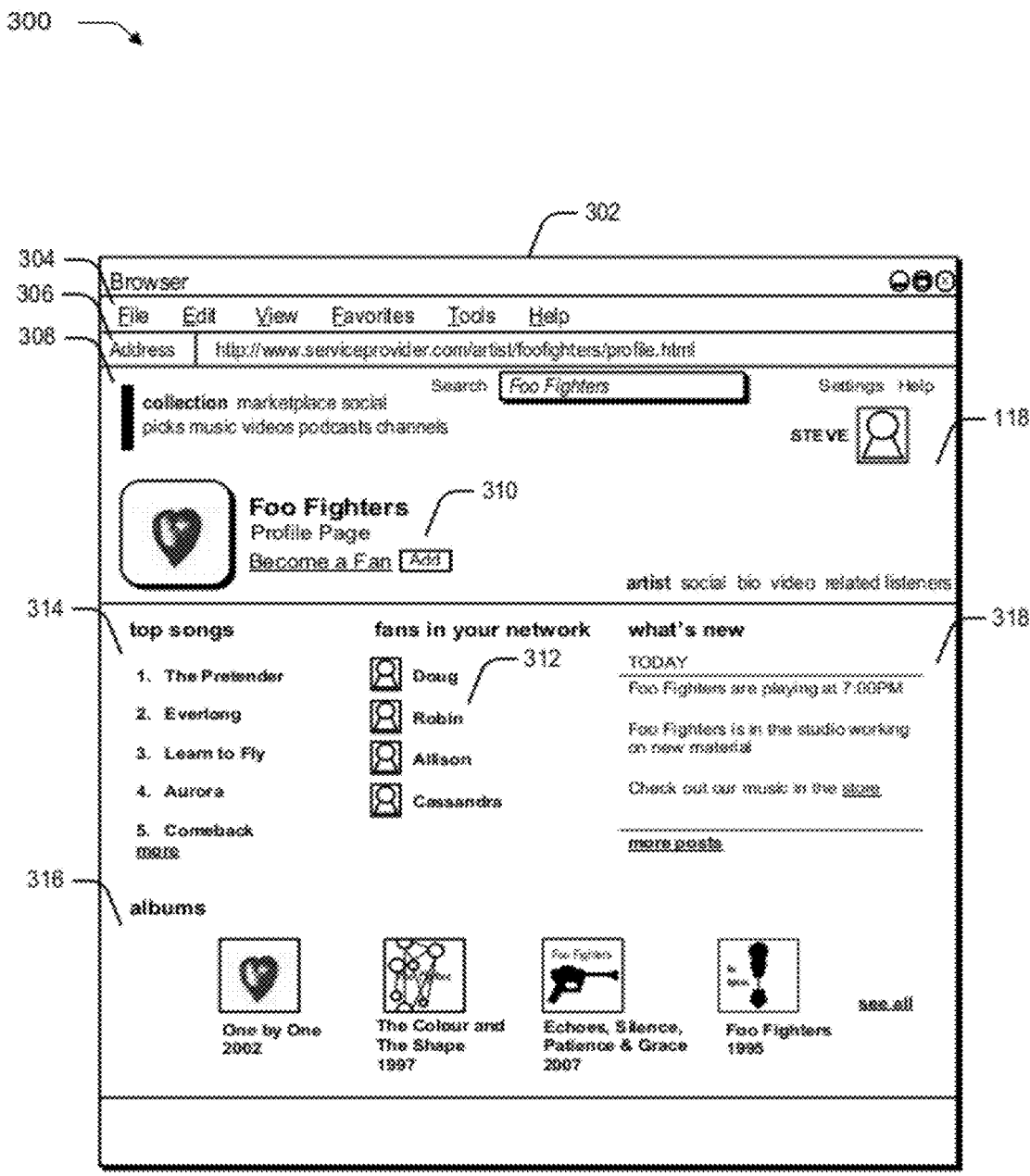
FIG. 3 is an example webpage configured to enable one way public relationships in accordance with one or more embodiments.

Referring now to FIG. 3, an implementation 300 is illustrated showing an example webpage 118 that is operable to enable one-way public relationships. The webpage 118 in this instance is illustrated as incorporated within a user interface 302 that may be provided by the communication module 136. For example, the communication module 136 may be configured as a browser operable to expose the user interface 302 to enable interaction with one or more service providers 102 and corresponding services 116. To provide the interaction with services 116, the user interface 302 includes a menu bar 304, an address bar 306, and a navigation portion 308. The menu bar 304 is a portion of the user interface 302 that includes drop-down menus of commands, examples of which are illustrated as "file," "edit," "favorites," "tools," and "help." The address bar 306 is configured to receive inputs to navigate to particular network addresses and/or display current network addresses, from which, the client 104 has received content that is being displayed. The navigation portion 308 may be operable to navigate to interact with a service provider 102 in various ways including selecting various services 116, performing for webpages 118, obtaining different webpages 118 corresponding to a social networking service, and so forth.

In the example of FIG. 3, the webpage 118 within the user interface 302 is configured as profile page for the band "Foo Fighters" that may be exposed to Steve via social networking service, music service, or other services 116 from the service provider 102. Although depicted as being part of the user interface 302 of a browser, a user interface comparable to the webpage 118 may also be provided by standalone applications of the client 104, such as a desktop social networking application. In each case, the webpage 118 may make use of a relation module 130 configured to enable one-way public relationships discussed herein.

A control is exposed that is operable to establish a one-way public relationship with the object (block 204). For instance, through interaction with various webpages 118, Steve may make selections to become a fan of objects in a social networking environment. Various controls selectable to cause a one-way relationship to be established with corresponding objects may be exposed within webpages 118 in conjunction with the objects. The controls may be configured in a variety of ways. By way of example and not limitation, a control may be configured as a button, selectable text, an icon, a menu item, or another suitable control exposed via the webpage 118.

In particular, the example webpage 118 in FIG. 3 is depicted as having an add control 310 that appears in the profile page for "Foo Fighters". The text "Become a Fan" appears by the add control 310. Steve may select the add control 310 to initiate creation of a fan relationship with the "Foo Fighters". Additionally or alternatively, the text "Become a Fan" may be selectable to create the fan relationship. In accordance with techniques described herein, the add control 310 and/other suitable controls may be configured to establish a one-way public relationship with a corresponding object.

Note that a fans list 312 of the webpage 118 is also illustrated that presents Steve with a list of friends in his social network that are fans of the "Foo Fighters". The fans list 312 may be configured based upon friends associated with Steve and the one-way public relationships established between those friends and the "Foo Fighters". The fans list 312 informs Steve about some of his friend's favorites and may assist Steve in deciding whether to become a fan himself.

In addition, the webpage 118 may include various other content portions related to the "Foo Fighters". For example, FIG. 3 depicts example content portions including a top songs list 314, an albums list 316 and a "what's new" portion 318 configured to present postings and status updates. Note that various other selectable controls (not shown) that are configured to initiate creation of fan relationships, including one-way public relationships, may be associated with and appear with other objects. For example, selectable controls operable to establish one-way public relationships may be associated with songs in the top songs list 314, albums in the albums list 316, and/or with postings in the "what's new" portion 318.

Responsive to operation of the control, the one-way public relationship is established between the client and the object (block 206). Continuing the preceding example, Steve may decide to become a fan of "Foo Fighters". To do so, Steve may select the add control 310 exposed in the example user interface 118 of FIG. 3. In this example, the add control 310 is selectable to become a fan of the "Foo Fighters", which may involve establishing a one-way public relationship between Steve and "Foo Fighters". Note that selectable controls may be configured to create different types of social networking relationships including one-way public relationships and mutual friend relationships.

As noted, one-way public relationships enable a user to gain access to a social network and related information of another party without providing the other party with access to the user's own social network or adding the other party to the user's contacts. In other words, the relationship is "one-way". Further, the other party's acknowledgement of the relationship with the particular user may not be required to establish a one-way public relationship between the user and the other party. One-way public relationships provide a mechanism for public entities such as bands, social organizations, authors, businesses, and so forth to leverage the popularity of social networks to interact with users (e.g., fans, members, customers), while overcoming privacy concerns that may keep some users from establishing mutual friend relationships with these public entities.

In contrast to the one-way public relationships, mutual friend relationships enable reciprocal sharing between parties. Both parties in a mutual friend relationship may have to agree to the relationship. Further, with mutual friend relationships, each party is given access to the other's social network and related information such as profile pages or other webpages, status updates, friends lists, favorites items, pictures, comments and so forth. Mutual friends may be added to a list of contacts that a user may have for use with one or more services 116. Users may choose to create mutual friend relationships with people who they know well, such as family members, classmates, relatives, and close friends.

To create these and other social networking relationships, relation module 130 may operate responsive to interaction of a user with a suitably configured control. For instance, relation module 130 may establish social networking relationships by way of user accounts with the service provider 102. The relation module 130 may be operable by a client 104, by a service provider 102, and/or in combination thereof. In particular, user selections of the controls may be detected by operation of a relation module 130 of service provider 102 and/or a client 104.

When a user selection to add a favorite object is detected, relation module 130 may store or update relation data 124 associated with an account of the user to reflect a social networking relationship between the user and the object. The relation data 124 for an object may include at least data to identify the object and data to describe a type of relationship (e.g., one-way public, or mutual friend)

In one or more embodiments, configurable settings may be employed to determine a type of relationship to be established when a control operable to create a social networking relationship is selected. Profile data 126 associated with user accounts may include settings to select a default relationship type for one or more user actions. For instance, a user may configure account settings in their profile data 126 such that one-way relationships are established by default for objects they select as favorites. In this manner, a control can be configured to create a one-way public relationship in response to a single-click and without further action by a user. Alternatively, a user may instead choose to configure account settings to set mutual friend relationships by default.

In at least some embodiments, a user may configure account settings to present an option to select a type of relationship when a control operable to create a social networking relationship is selected. Accordingly, a dialog box, webpage or other suitable message may be presented when a control is selected that provides an option to choose a one-way public relationship or a mutual friend relationship for a corresponding object. Thus, a relationship to an object may be created in accordance with a user selection in response to an option to select a type of relationship.

In another example, a type of relationship to be established may be based upon attributes associated with a selected object. For instance, objects may include a relation-type attribute that indicates whether the object is public or private. An owner of an object may set the relation-type attribute to control the type of relationship that is created when users become fans of the object. When a user selects a control to become fan of an object, relation module 130 uses the attributes to determine a type of relationship to establish. In an embodiment, one-way public relationships are established for objects designated as public. For other objects, the default may be to establish a mutual friend relationship that enables reciprocal exchanges. Thus, a one-way public relationship may be selectively established based upon the attributes.

Consider again the example band profile page of FIG. 3. Assume that Steve has configured his account with the service provider 102 to establish one-way public relationships by default. In this case, a selection of the example add control 310 may automatically establish a one-way public relationship between Steve and "Foo Fighters". In particular, when Steve selects the example add control 310 of FIG. 3, an entry for "Foo Fighters" may be created in relation data 124 corresponding to an account of Steve's with the service provider 102. The relation data 124 that is created includes data to define the relationship as a one-way public relationship.

When one-way public relationships to objects are established, services are provided to the client using the one-way public relationships (block 208). For example, a service provider 102 and/or content provider 106 may make use of one-way public relationships in various ways to provide related services to clients 104. By way of example and not limitation, this may include serving content to the clients based on the one-way public relationship (block 210) and/or providing status updates regarding the object to client (block 212).

For instance, Steve may be able to post on a "Foo Fighters" social network page and obtain content and/or status updates related to "Foo Fighters" based on the one-way public relationship established in the preceding example. Further, the one-way public relationship may be employed by the service provider 102 to serve content and/or ads related to the "Foo Fighters" to Steve's account across various services 116. The one-way public relationships may also be employed by the service provider 102 to push status updates for "Foo Fighters" to Steve's account.

By way of example, Steve may interact with a communication module 136 of a client 104 to obtain a webpage 118 that corresponds to his own profile page. Status updates regarding "Foo Fighters" may appear within Steve's profile page. A favorite item list may also appear that indicates that Steve is a fan of the "Foo Fighters". In addition, service provider 102 may configure the profile page to include an advertisement in the profile that relates to "Foo Fighters", such as an advertisement for an upcoming concert, a similar band, a music retailer, or another suitable advertisement.

Note once again that a mutual friend relationship is not established between Steve and "Foo Fighters." Accordingly, "Foo Fighters" is not provided reciprocal access to Steve's social network and related information. Further examples related to using one-way public relationships to provide content, ads, and/or status updates across various services 116 may be found in relation to the following figures.

Figure 4:
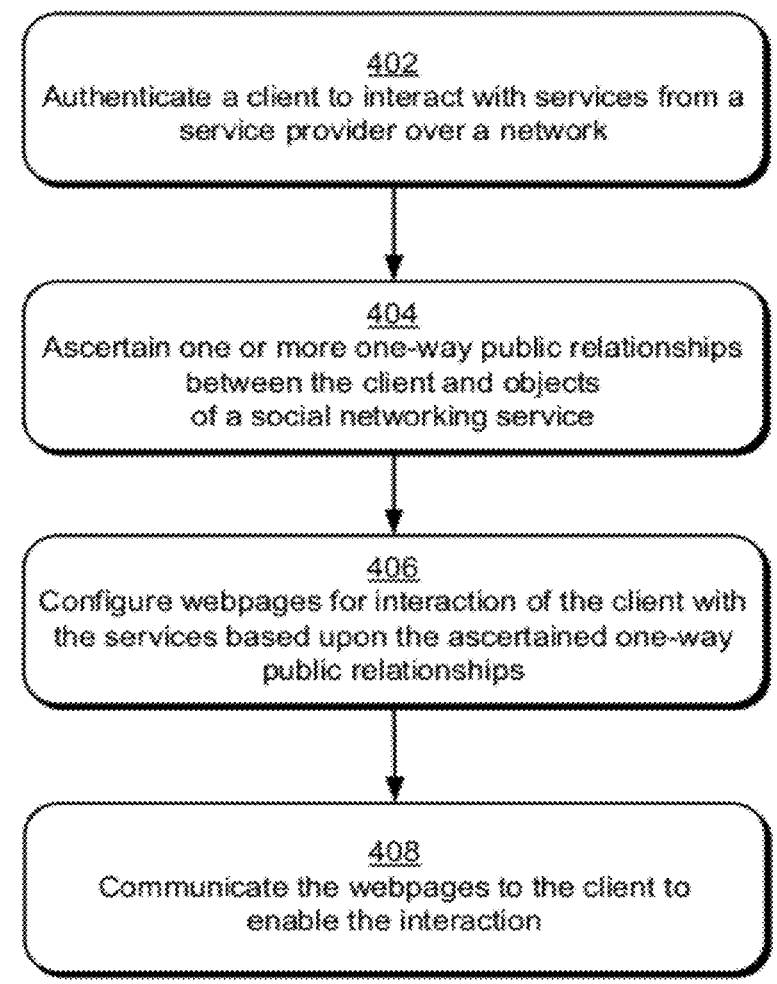
FIG. 4 is a flow diagram depicting a procedure in an example implementation in which a webpage is configured based upon one-way public relationships.

FIG. 4 depicts a procedure 400 in an example implementation in which one-way public relationships are employed to configure webpages output for interaction with one or more services. In at least some embodiments, procedure 400 may be performed by a suitably configured service provider, such as service provider 102 of FIG. 1 having a relation module 130. In the discussion of FIG. 4 that follows, reference may be made to the example webpages depicted in FIG. 5 and FIG. 6.

A client is authenticated to interact with services from a service provider over a network (block 402). For example, the user Steve in the foregoing discussion may have a user account through a service provider 102 that enables Steve to interact with a plurality of services 116 from the service provider 102. Steve may execute a communication module 136 of a client 104 (e.g., a browser) to access his account and corresponding services 116. As noted above, an authentication service of the service provider 102 may operate to authenticate users to access services 116. This may involve requesting credentials (user name and password) from the client 104 when Steve attempts access to his account. Upon successful authentication (e.g., verification of the credentials), the client 104 is permitted to access Steve's account and corresponding services 116. In at least some embodiments, authentication to a single account provides access to many service providers 102 and/or to an entire suite of services 116.

One or more one-way public relationships are ascertained between the client and objects of a social networking service (block 404). For instance, relation module 130 of service provider may operate to examine relation data 124 associated with an authenticated account to ascertain one-way public relationships corresponding to the account. The one-way public relationships may be established with objects in various ways, such as the examples discussed with respect to procedure 200 of FIG. 2.

Consider the foregoing example of a one-way public relationship established by Steve with the band "Foo Fighters." Relation module 130 identifies this relationship based upon relation data 124 stored in the account database 120 for Steve's account. One or more service providers 102 makes use of the ascertained one-way public relationships to provide related content, ads, and/or updates in conjunction with a plurality of services 116.

In particular, webpages for interaction of the client with the services are configured based upon the ascertained one-way public relationships (block 406). The webpages are communicated to the client to enable the interaction (block 408). For example, a service provider 102, by way of service manager module 114, may configure webpages 118 for communication to a client 104 over a network 108. At least some of the webpages 118 are configured based upon a one-way public relationship, such as the relationship that is ascertained between Steve and "Foo Fighters" in the preceding example. The webpages that are configured based on the one-way public relationship may include pages output for interaction with a social networking service, such as Steve's profile page and/or "Foo Fighters" profile page. Some example webpages corresponding to a social networking service are depicted in FIG. 5 and FIG. 6, and discussed just below.

Figure 5:
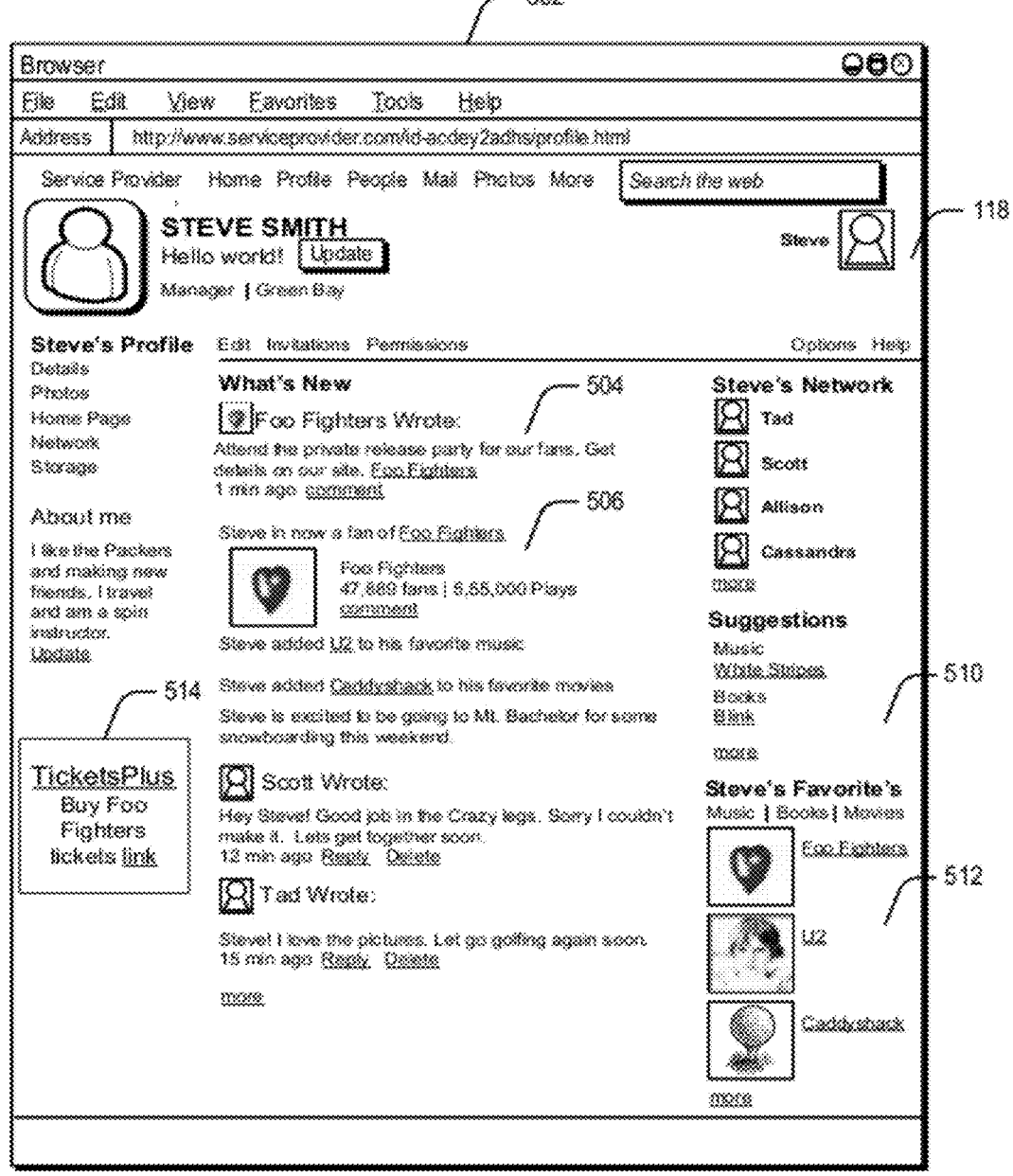
FIG. 5 is an illustration of an example web page configured based upon one-way public relationships.
Figure 6:
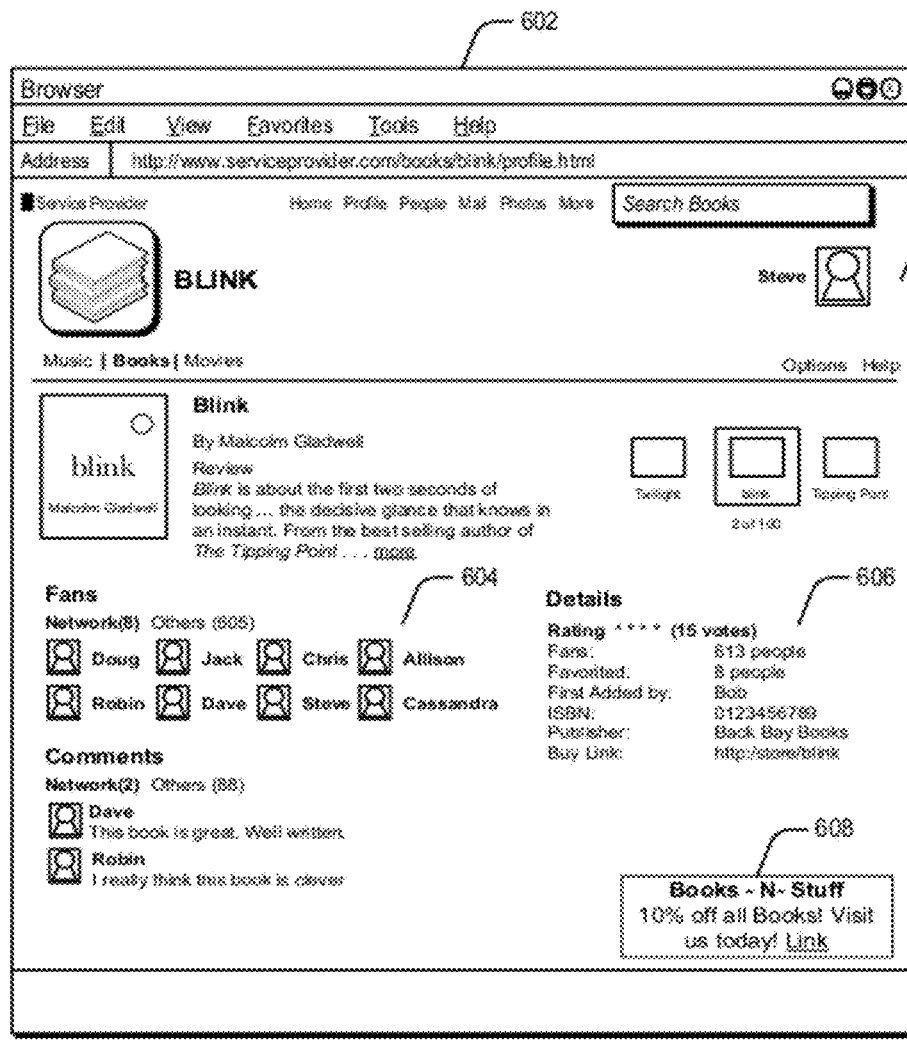
FIG. 6 is an illustration of another example web page configured based upon one-way public relationships.

FIG. 5 depicts an implementation 500 showing an example webpage 118 that is configured based upon one-way public relationships. The webpage 118 in this instance is illustrated as incorporated within a user interface 502 that may be provided by the communication module 136. For example, the communication module 136 may be configured as a browser operable to expose the user interface 502 to enable interaction with one or more service providers 102 and corresponding services 116.

In the example of FIG. 5, the webpage 118 within the user interface 502 is configured as a profile page corresponding to the user Steve from the preceding examples. A comparable page may also be configured as other webpages, such as being a homepage of Steve's with a service provider 102, a favorites page configured to present updates for items that Steve has selected as favorites, a social network homepage, or other suitable webpage provided via social networking service or other services 116. The example webpage 118 includes a variety of portions that are configured based upon a one-way public relationship between Steve and "Foo Fighters." For example, a status update 504 appears in a "what's new" section of the example webpage 118. The status update 504 may be input by "Foo Fighters" on their own profile page. Service provider 102 may make use of relation data 124 to configure the webpage 118 to include the status update 504. Note that a comparable status update may appear on "Foo Fighters" profile page.

The "what's new" section of the example webpage 118 also includes a fan entry 506 that indicates that Steve has become a fan of "Foo Fighters". A corresponding fan entry 506 may also appear in home pages, profile pages, and/or other pages configured for Steve's mutual friends. Since the relationship to "Foo Fighters" is one-way, however, a comparable fan entry indicating that Steve has become a fan may not appear on "Foo Fighters" profile page. In other words, status updates regarding Steve may not be pushed to "Foo Fighters" or to other one-way relationships established by Steve. Status updates, such as the example fan entry 506, may appear in various webpages corresponding to Steve presented in the course of user interaction with a social networking service and/or other services 116 from one or more service providers 102.

Additional examples of portions of the webpage 118 that may be configured based upon a one-way public relationship include a suggestion list 510, a list of favorites 512, and an advertisement 514. The suggestion list 510 includes one more suggestions that are based on one-way public relationships. The suggestion list 510 may enable service provider 102 to suggest content based on items that a user has expressed interest in. For instance, a fan of a band may also like music from similar bands. In the depicted example a music suggestion for "The White Stripes" may be based in part on Steve's one-way public relationship to "Foo Fighters." Likewise, the example list of favorites 512 includes the "Foo Fighters" in accordance with the one-way public relationship. Further, the example advertisement 514 provides an offer to buy "Foo Fighters" tickets and may be selected in accordance with the one-way public relationship. Thus, FIG. 5 illustrates some examples of portions of a webpage 118 that may be configured based upon a one-way public relationship.

FIG. 6 depicts an implementation 600 showing another example webpage 118 that is configured based upon one-way public relationships. The webpage 118 in this instance is illustrated as incorporated within a user interface 602 that may be provided by the communication module 136. For example, the communication module 136 may be configured as a browser operable to expose the user interface 602 to enable interaction with one or more service providers 102 and corresponding services 116.

In the example of FIG. 6, the webpage 118 within the user interface 602 is configured as profile page corresponding to a book entitled "Blink." FIG. 6 represents one example of a webpage 118 related to a public entity and/or a social network object (e.g., the book) that may be configured to include portions based upon one-way public relationships to the object. In particular, a webpage for an object may be customized for an authenticated user to include portions corresponding to the user's social network and one-way public relationships to the object. Examples of portions that may be customized include a fans portion 604, an object details portion 606, and an advertisement 608.

In the illustrated example, the authenticated user is Steve. Accordingly, the webpage 118 for the book "Blink" includes portions corresponding to Steve's social network and the social network's relationships to the object. For instance, relation module 130 may be operable to indentify relationships of people in Steve's network to objects and configure webpages output to Steve based on the identified relationships. Relation module 130 may make use of user accounts and relation data 124 to understand the relationships that exist between users and objects.

In particular, the fans portion 604 shows friends of Steve who are also fans of the book. The fans portion 604 shows that eight people in Steve's network are fans and also shows that six hundred and five other people are also fans. The fans portion 604 is also illustrated as showing comments on the book from fans in Steve's network. Note that information related to Steve's network would not appear on a webpage for the book "Blink" that is presented to another user who is outside of Steve's network. Thus, the fans portion 604 may be configured to selectively include information regarding fans based upon one or more one-way public relationships between users and the book "Blink."

Note also that the owner of the webpage 118 (e.g., publisher and/or author) may be able to use one-way relationships to obtain anonymous data regarding fans of the object. This anonymous data enables the owner to at least track a number of fans of the object and include this information on the webpage 118. For example, the object details portion 606 is configured to list six hundred and thirteen fans of the book "Blink." In addition, fans may provide ratings for an object, indicate that the object is a favorite, and/or rank objects one to another. For instance, the example object details portion 606 depicts a four star rating for the book and shows that eight people have indicated that this book is their favorite.

The anonymous data that is made available through one-way relationships may also include demographic information such as ages, location, income, education level, and so forth. Such demographic information may be used by the owner and/or service provider 102 to better understand people who have expressed interest in corresponding objects available through social networking service.

The example advertisement 608 of FIG. 6 provides a promotion for books and a link to an online retailer. The advertisement 608 may be selected in accordance with one-way public relationships between Steve and the book "Blink," other books, and/or various other objects.

In at least some embodiments, content and/or ads for webpages served to Steve may be selected in accordance with the one-way public relationships to objects established by people in Steve's network. This may be the case even when Steve has not expressed interest in the objects on his own. In this manner, a service provider 102 anticipates that Steve may like certain things based upon the interests of his social networking friends. Accordingly, the service provider 102 may configure webpages for Steve with content and/or ads based on the one-way public relationships of other people in Steve's network.

Although some of the examples discussed herein relate to webpages for social networking service, webpages configured based on one-way public relationships may also include pages output in conjunction with other services 116, such as an email service, an instant messaging service, an Internet search service, and/or a productivity service to name a few. For example, an internet home page corresponding to Steve may be configured to include content related to "Foo Fighters" based upon the one-way public relationship.

In addition, service provider 102 may be configured to distribute content related to one-way public relationships via various electronic communications including emails, instant messaging, text messages, mobile phone messages, voice mail, and so forth. In this example, the electronic communications are configured to include content, ads, and/or updates corresponding to one-way public relationships to an object. For instance, Steve may receive an email from the service provider 102 that includes a new posting made to the profile page of the "Foo Fighters" using the social networking service. This email may also include advertisements, song lists, promotions, and/or other content that is customized for Steve based on the one-way public relationship to "Foo Fighters."

Having considered example techniques and user interface for one-way public relationships, consider now a discussion of an example devices that can be used to implement one or more embodiments.

Example Device

Figure 7:
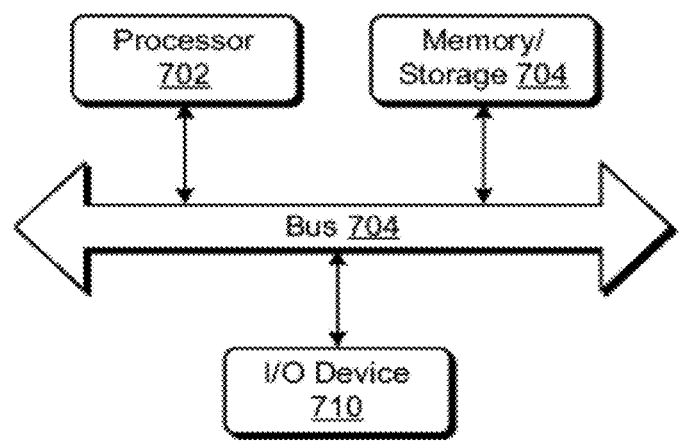
FIG. 7 is an illustration of an example device in accordance with one or more embodiments.

FIG. 7 illustrates an example computing device 700 that may implement the various embodiments described above. Computing device 700 may be, for example, a client 104 of FIG. 1, a server of a service provider 102, or any other suitable computing device.

Computing device 700 includes one or more processors or processing units 702, one or more memory and/or storage components 704, one or more input/output (I/O) devices 706, and a bus 708 that allows the various components and devices to communicate one to another. The bus 708 represents one or more of several types of bus structures, including a memory bus or memory controller, a peripheral bus, an accelerated graphics port, and a processor or local bus using any of a variety of bus architectures. The bus 708 can include wired and/or wireless buses.

Memory/storage component 704 represents one or more computer storage media. Memory/storage component 704 may include volatile media (such as random access memory (RAM)) and/or nonvolatile media (such as read only memory (ROM), Flash memory, optical disks, magnetic disks, and so forth). Memory/storage component 704 may include fixed media (e.g., RAM, ROM, a fixed hard drive, etc.) as well as removable media (e.g., a Flash memory drive, a removable hard drive, an optical disk, and so forth).

One or more input/output devices 706 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. Computer-readable media may include a variety of available medium or media that may be accessed by a computing device. By way of example, and not limitation, computer-readable media may comprise "computer-readable storage media".

Software or program modules, including the favorites module 130, communication module 136, service manager module 114, and other program modules, may be embodied as one or more instructions stored on computer-readable storage media. Computing device 700 may be configured to implement particular functions corresponding to the software or program modules stored on computer-readable storage media. Such instructions may be executable by one or more articles of manufacture (for example, one or more computing device 700, and/or processors 702) to implement techniques for one-way public relationships, as well as other techniques. Such techniques include, but are not limited to, the example procedures described herein. Thus, computer-readable storage media may be configured to store instructions that, when executed by one or more devices described herein, cause various techniques for one-way public relationships.

Computer-readable storage media includes volatile and non-volatile, removable and non-removable media implemented in a method or technology suitable for storage of information such as computer readable instructions, data structures, program modules, or other data. Computer-readable storage media can include, but is not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or another tangible media or article of manufacture suitable to store the desired information and which may be accessed by a computer.

CONCLUSION

Although the techniques for one-way public relationships have been described in language specific to structural features and/or methodological acts, it is to be understood that the appended claims are not necessarily limited to the specific features or acts described. Rather, the specific features and acts are disclosed as example forms of implementing the techniques for one-way public relationships.

What is claimed is:

1. A method comprising:
configuring a webpage for output to a client over a network to provide to a user of the client an indication of one or more other users that are part of a social network of the user and have established one-way public relationships, respectively, with another user corresponding to an object of a social networking service available from a service provider;
exposing a control on the webpage to the client in conjunction with the object, the control selectable by the user of the client to establish a one-way public relationship with the other user corresponding to the object;
responsive to operation of the control, establishing the one-way public relationship by storing data to associate the user as a fan of the object without establishing a mutual friend relationship between the user and the other user; and
based on the one-way public relationship, allowing the user of the client to post on a profile page associated with an owner of the object.

2. A method as described in claim 1, wherein the one-way public relationship enables the user to obtain content and status updates regarding the object in conjunction with a plurality of services from the service provider.

3. A method as described in claim 1, wherein storing data to associate the user as a fan of the object comprises storing the data in association with an account of the user with the service provider.

4. A method as described in claim 3, wherein the account of the user enables access to a plurality of services provided by the service provider based upon a single authentication.

5. A method as described in claim 1, wherein the webpage is a social networking page presented to the user in conjunction with the social networking service available from the service provider.

6. A method as described in claim 1, wherein the webpage is a personal page of the user presented in conjunction with one or more services from the service provider.

7. A method as described in claim 1, further comprising communicating status updates regarding the object to the user based upon the one-way public relationship.

8. A method as described in claim 7, wherein communicating the status updates regarding the object comprises configuring webpages for output to the user that include the status updates.

9. A method as described in claim 7, wherein communicating the status updates regarding the object comprises distributing the status updates to the user as one or more electronic communications.

10. A method as described in claim 1, wherein operation of the control comprises a single-click that automatically causes the establishing of the one-way public relationship.

11. A method as described in claim 1, wherein:
operation of the control presents the user with an option to select the one-way public relationship or a mutual friend relationship with the other user; and the establishing of the one-way public relationship occurs based upon a selection received from the user in response to the option.

12. A method as described in claim 1, wherein:
the client is authenticated to an account of the user with the service provider;
profile data associated with the account includes a setting that designates the one-way public relationship as a default type of relationship; and
the establishing of the one-way public relationship occurs based upon the setting included in the profile data.

13. A method comprising:
authenticating a client to an account of a user to permit interaction with a plurality of services available via a service provider over a network;
ascertaining one or more one-way public relationships between the client and objects of a social networking service provided by the service provider based upon relation data stored in conjunction with the account; and
configuring webpages for the interaction of the client with the plurality of services based upon the ascertained one or more one-way public relationships, at least one of the plurality of services configured to allow the client to post on social network pages associated with owners of the objects based upon the ascertained one or more one-way public relationships, the webpages being configured to provide an indication of one or more other user that are in a social network associated with the account of the user and which have established one-way public relationships, respectively, with the objects.

14. A method as described in claim 13, wherein the one or more one-way public relationships enable the user to express interest in the objects without establishing mutual friend relationships with owners of the objects.

15. A method as described in claim 14, wherein configuring the webpages includes selecting content and advertisements for the webpages that are related to the objects.

16. One or more computer-readable storage media comprising instructions that, when executed by a computing device configured to provide social networking service to a plurality of clients, cause the computing device to:
establish one-way public relationships between the plurality of clients and an object corresponding to a social networking webpage of an owner in response to user selections of the object received from the plurality of clients;
allow the plurality of clients to post on the social networking webpage of the owner of the object based upon the established one-way public relationships;
serve content associated with the object to the plurality of clients based upon the one-way public relationships; and
configure webpages output to one or more of the plurality of clients based upon the established one-way public relationships by at least causing the webpages to indicate which of the plurality of clients having the established one-way public relationships with the object are also in a social network associated with the one or more of the plurality of clients to which the webpages are output.

17. One or more computer-readable storage media as described in claim 16, wherein the one-way public relationships to the object are configured such that the owner is not included in social networks corresponding to the plurality of clients.

18. One or more computer-readable storage media as described in claim 16, wherein the content includes advertisements selected based upon the one-way public relationships.

19. One or more computer-readable storage media as described in claim 16, wherein the one-way public relationships are established in accordance with an attribute of the object that designates a type of relationship to establish for the object.

20. One or more computer-readable storage media as described in claim 16, wherein the one-way public relationships are establishable without requiring an acknowledgment by the owner of the object.

\* \* \* \* \*